United States Patent

Holakovszky et al.

Patent Number: 5,682,173
Date of Patent: Oct. 28, 1997

[54] IMAGE DISPLAY DEVICE

[76] Inventors: László Holakovszky; Endre Nagykálnai; László Kézi, all of Budapest, Hungary

[21] Appl. No.: 513,938
[22] PCT Filed: Jul. 25, 1994
[86] PCT No.: PCT/HU94/00029
§ 371 Date: Aug. 30, 1995
§ 102(e) Date: Aug. 30, 1995
[87] PCT Pub. No.: WO95/04435
PCT Pub. Date: Feb. 9, 1995

[30] Foreign Application Priority Data

Jul. 27, 1993 [HU] Hungary ................... 93 02167

[51] Int. Cl.$^6$ ........................................ G04G 5/00
[52] U.S. Cl. ................... 345/8; 348/53; 359/630
[58] Field of Search ................. 345/7, 8, 9; 348/53; 359/13, 630, 633

[56] References Cited

U.S. PATENT DOCUMENTS

| | | | |
|---|---|---|---|
| 4,021,846 | 5/1977 | Roese | 359/465 |
| 5,299,063 | 3/1994 | Fritz et al. | 345/7 |
| 5,392,158 | 2/1995 | Tosaki | 359/630 |
| 5,418,584 | 5/1995 | Larson | 359/630 |
| 5,477,385 | 12/1995 | Freeman | 359/633 |

FOREIGN PATENT DOCUMENTS

WO85/04961  11/1985  WIPO ................... 359/13

Primary Examiner—Kee M. Tung
Assistant Examiner—Matthew Luu
Attorney, Agent, or Firm—Blakely Sokoloff Taylor & Zafman

[57] ABSTRACT

A head worn image display device, particularly TV picture display device, includes a TV screen or an image holder, and optical elements for transmitting a light beam from the screen or image to the eyes. The essence of the invention is that the device comprises optical elements dividing the beam starting from the screen (4) or image into beam branches, and directing the beam branches towards the eyes of a user of the device; optical elements reflecting the beam branches into the pupils (14,15); and focusing elements arranged between the reflecting optical elements and the pupils, and/or between the dividing optical elements and the reflecting optical elements.

25 Claims, 7 Drawing Sheets

IMAGE DISPLAY DEVICE

The invention relates to an image display device, particularly a TV image display device, wearable on head.

Head worn TV image display devices are known in the art. One part of said devices has a stereoscopic system, i.e. the viewer sees two different images or screens with the left and right eye, respectively. Stereoscopic devices are described in U.S. Pat. Nos. 5,123,726, 5,129,716, 4,897,715, 4,706,117, and in German Patent Specification No. 1103961, especially in the part relating to FIG. 5. The drawback of head worn TV devices is that two image display units should be built in, practically resulting in double expenses, weight, volume and failure rate. On the other hand, it is an advantage that the image can be seen with both eyes.

Head worn TV sets having only one screen are also known. Such devices are described e.g. in the above mentioned German Patent Specification No. 1103961 (FIG. 2), and in the USA product catalog "Sharper Image" (June, 1993) relating to a device called "Virtual Vision Sport". A major drawback of said devices results from the fact that the single screen can be viewed with only one eye, i.e. while one eye is fixed on the screen, the other one sees the surroundings in the same direction, which is rather disturbing. And if the user of the device closes the other eye while viewing the TV picture, he/she is forced to blink, which is tiring.

It is also known from the above-mentioned German Patent Specification No. 1103961 (claim 9 and the corresponding disclosure) that a cathode-ray tube is built in one of the side-pieces of a spectacle-like device, and the picture produced by the cathode-ray tube is reflected into both eyes of the user by an optical system having a semi-permeable mirror. The disadvantage of this device arises from that the TV picture and the background behind the mirror are superimposed on the semi-permeable mirror arranged in front of the eye, which is disturbing and, on the other hand, the semi-permeable mirror causes a light-loss of about 50%.

A common drawback of all the above-mentioned known head worn TV image display devices is the strange appearance; they are relatively bulky and cumbersome as compared with a pair of glasses, and attract attention among people.

It is therefore the object of this invention to provide a small, light weight and compact head worn image display device, particularly a TV image display device, by means of which an image or screen can be viewed with both eyes without any loss of light intensity caused by a semi-permeable mirror. Preferably, the device should be suitable for being fixed to ordinary spectacles and carried together.

The invention is based on the recognition that an image or screen of small size placed between the two eyes in front of the nose or the middle of the forehead can be made visible for both eyes if the light rays starting from the image or screen are reflected in two directions by means of dividing mirrors fixed sufficiently distant from said image or screen, in other words the light beam—light path—starting from the screen is split into two part-beams (branches), and then said part-beams are reflected to the eyes by means of further mirrors. (The dividing mirrors—two mirrors—are preferably placed side by side forming an angle of 90°±35° with each other.) If the dividing mirrors, having expediently about the same size as the image or screen has, are placed too close to the image or screen, the image—because it is seen excessively from the side—is deformed into a trapezium, and even in opposite manner for the two eyes. Although the human brain can compensate the deformed images to a certain extent and therefore perceive them as a single image, this is, however, tiring for a long time and straining the eyes, and beyond a certain limit the two images cannot be united. It has been found advantageous if the angle of dividing the light paths does not exceed 15°. (This angle corresponds to the angle of "comparison" of the optical axes of the eyes when reading a book held at a distance of about 30 cm.) However, this condition is in contradiction with the requirement that the image or screen should be as near as possible to the frame, e.g. spectacle-frame, holding said image or screen, because this is needed to get a compact unit. In order that the image or screen may be placed directly in front of the (spectacle-) frame, the light beam starting outwards from the image or screen should—according to our recognition—be "returned" towards the frame, i.e. it should be refracted by means of one or more common mirror(s).

On the basis of the above recognitions, the object of this invention is accomplished by a head worn image display device, particularly a TV picture display device, comprising a TV screen or means for holding the image, and optical elements for passing the light beam starting from the screen or image to the eyes, The essence of the invention is that the image display device comprises optical element(s) dividing the beam starting from the screen or image into beam branches, and directing said beam branches towards the eyes of a user of the device; optical elements reflecting said beam branches into the pupils; and focusing elements arranged between said reflecting optical elements and the pupils, and/or between said dividing optical elements and said reflecting optical elements. It is expedient if the device comprises an optical element reflecting the light beam travelling outwards from the screen or image upwards or downwards in relation to the head; and a further optical element dividing the light beam reflected upwards or downwards into beam branches and reflecting said beam branches to optical element(s) directing said beam branches towards the eyes. It is to be noted that the term "screen", as used here, includes any image display unit, e.g. liquid crystal display (LCD), cathode-ray tube (CRT), picture tube, plasma display etc. The "image" can be e.g. a square of microfilm, a coloured image, a printed text etc.

In another embodiment of the invention, the screen or image is arranged in front of the ridge of nose or the middle part of the forehead of the person wearing the device, in the theoretical (imaginary) median plane of the head, perpendicularly to said median plane.

In a preferred embodiment, the optical element dividing the light beam into two beam branches and directing said beam branches towards the eyes comprises two dividing mirrors juxtaposed at an angle ($\alpha$) of 90°±35°, where said angle opens towards the face; in this case, it is expedient if the dividing mirrors have a shape like a lying trapezium or rectangle, and the inner short edges of said dividing mirrors are in the theoretical, imaginary median plane of the head. It is to be mentioned that the dividing mirrors can be fixed to each other or they can be formed integrally with each other; in the latter case, they appear as a single optical element.

In a further embodiment of the device, the optical element reflecting the light beam travelling outwards from the screen or image upwards or downwards, consists of a first common mirror; and the optical element passing the light beam coming from said first common mirror to the optical element(s), preferably dividing mirrors, dividing the light beam into beam branches and directing said beam branches towards the eyes, consists of a second common mirror. In this case it is expedient if the common mirrors have a shape like a trapezium, said common mirrors are in planes being perpendicular to the median plane of the head, and forming an angle (ω) of 90°±35° between each other and angles (β)—preferably equal in size—with the plane of the screen or image.

In another preferred embodiment of the invention, the optical elements reflecting the beam branches into the pupils consist of separate mirrors—preferably having the shape of a lying rectangle—the planes of said separate mirrors form an angle (γ) preferably of about 90° between each other, and each of said separate mirrors is about 3 to 4 cm distant from the corresponding pupil. It is also expedient if the focusing elements are lenses, and the image or screen is placed above or below the optical element(s)—preferably dividing mirrors—dividing the light beam into part-beams. Generally, a light-source, preferably a transilluminating light, and a parabolic mirror are placed behind the screen or image in an inner cover.

According to another characteristic of the invention, the reflecting optical elements, except the optical elements reflecting the beam branches into the pupils, the focusing elements as well as the screen or image, the light-source and the parabolic mirror, possibly enclosed in an inner cover, are placed in a common outer cover having an opening or openings and/or light transmitting surface or surfaces; and said outer coves is attached to a frame, preferably spectacle-frame, fixable on the head, e.g. to the ears.

In a further preferred embodiment of the device, in accordance with the invention, a fixing element, e.g. screw, hook, clip or the like, is provided for joining the outer cover to the frame in a detachable manner. It is also expedient if consoles protruding on both sides towards the eyes, and preferably made of a transparent plastic plate, are fixed to—or possibly formed integrally with—the outer cover; and optical elements, preferably separate mirrors, reflecting the part-beams into the pupils are connected to said consoles on the portion protruding into the surroundings of the eyes. In general, the latter optical elements, preferably separate mirrors, are connected to the consoles by means of slides. This embodiment enables the separate mirrors to be adjusted to the eyes of the actual user.

If it is desired to produce a stereoscopic image by means of the device, LCD light shutters are placed in the track of the beam branches between the screen or image and the pupils. In a preferred embodiment of this device, the LCD light shutters are placed directly in front of the optical element(s) splitting the light beam into beam branches, preferably in front of the joined edges of the dividing mirrors, in a plane perpendicular to the median plane of the head. It is also expedient if the LCD light shutters belonging to the left side and right side beam branches have common glass-plates with the liquid crystal between, but the LCD light shutters are connected in a manner enabling an individual voltage control.

In a further preferred embodiment of the device, a controlling-driving unit is provided, which is connected with the screen or image, and possibly with the light-source, by means of an electric cable passing the supply voltage and/or video signal and/or control informations. It is advantageous if an earphone/loudspeaker is provided, which is connected to the electric system of the device. In another embodiment two optical elements, preferably separate mirrors, reflecting the beam branches into the pupils are placed in each path of the beam branches. It is also advantageous if the outer cover is fixed to the frame, preferably spectacle-frame, in an indetachable manner, or it is formed integrally with said frame.

According to a further feature of the invention, the consoles have an elongated, broken-line part reaching behind the ears; and the outer cover is provided with a nose support. In a further embodiment a darkened transparent or non-transparent additional cover is placed on the frame, preferably spectacle-frame, said additional cover having a spacial form disclosing the outer cover and the consoles. It is expedient if the additional cover is joined to the frame, preferably spectacle-frame, or to the outer cover by means of a hinge.

It is also expedient if the lenses in the spectacle-frame are made of darkened glass or plastics, but the lenses have—regarding spectacles being worn—parts between the pupil and the optical element reflecting a beam branch into the pupil, made of a material clear as water or cut out; and the other parts of the lenses are made preferably of a material darkening when exposed to light.

To ensure the best image, the reflecting optical elements and the focusing elements are arranged symmetrically to the theoretical imaginary median plane of the head of the user.

The present invention will now be described by way of examples with reference to the accompanying drawings, in which.

Figure 1A:
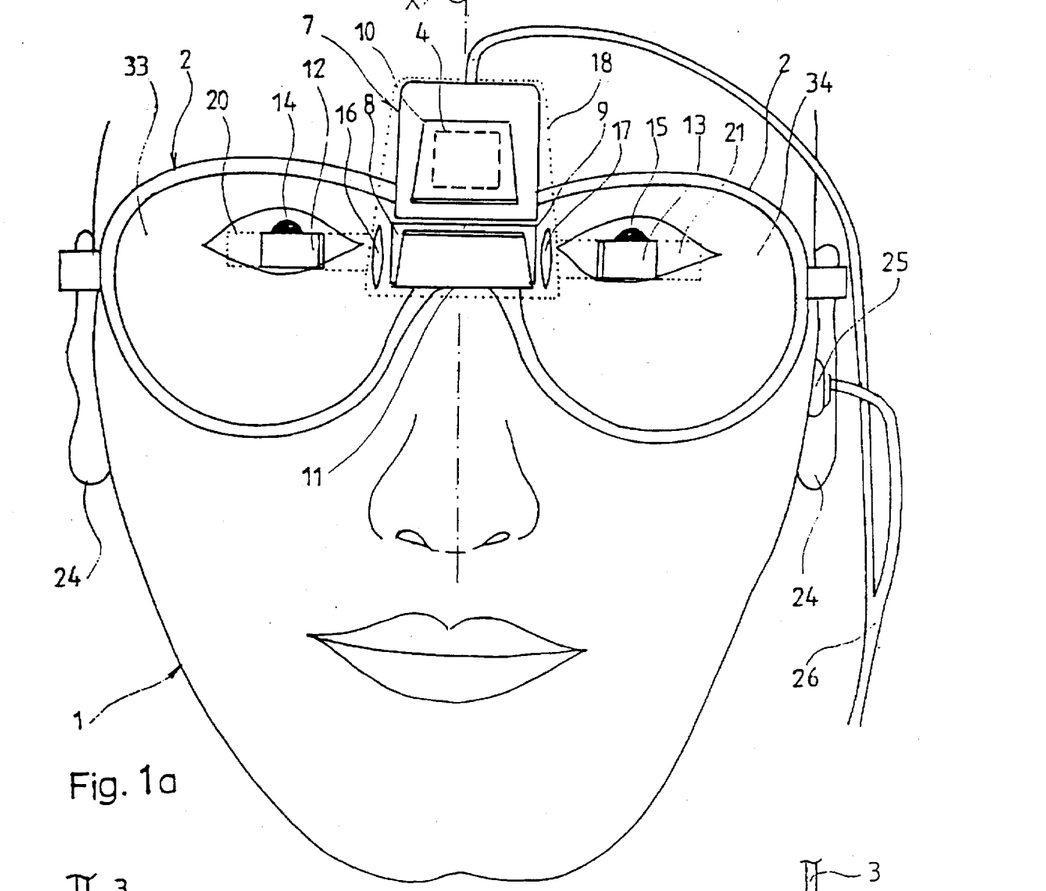
FIG. 1a is a front elevational view of a preferred embodiment of the device according to the invention, placed on the head of a user.
Figure 1B:
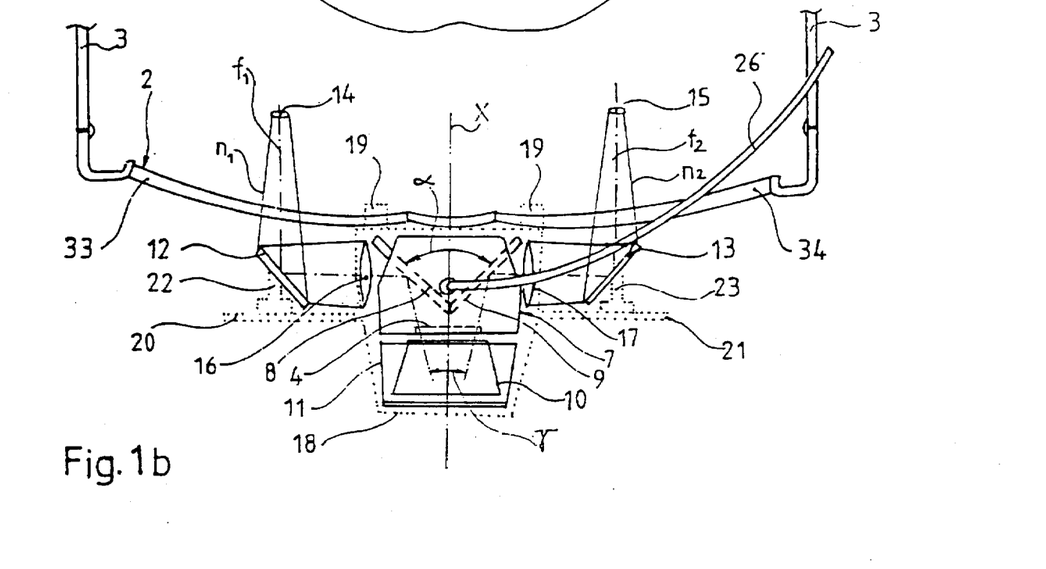
FIG. 1b is a top plan view of the device shown in FIG. 1a without the head of the user.
Figure 1C:
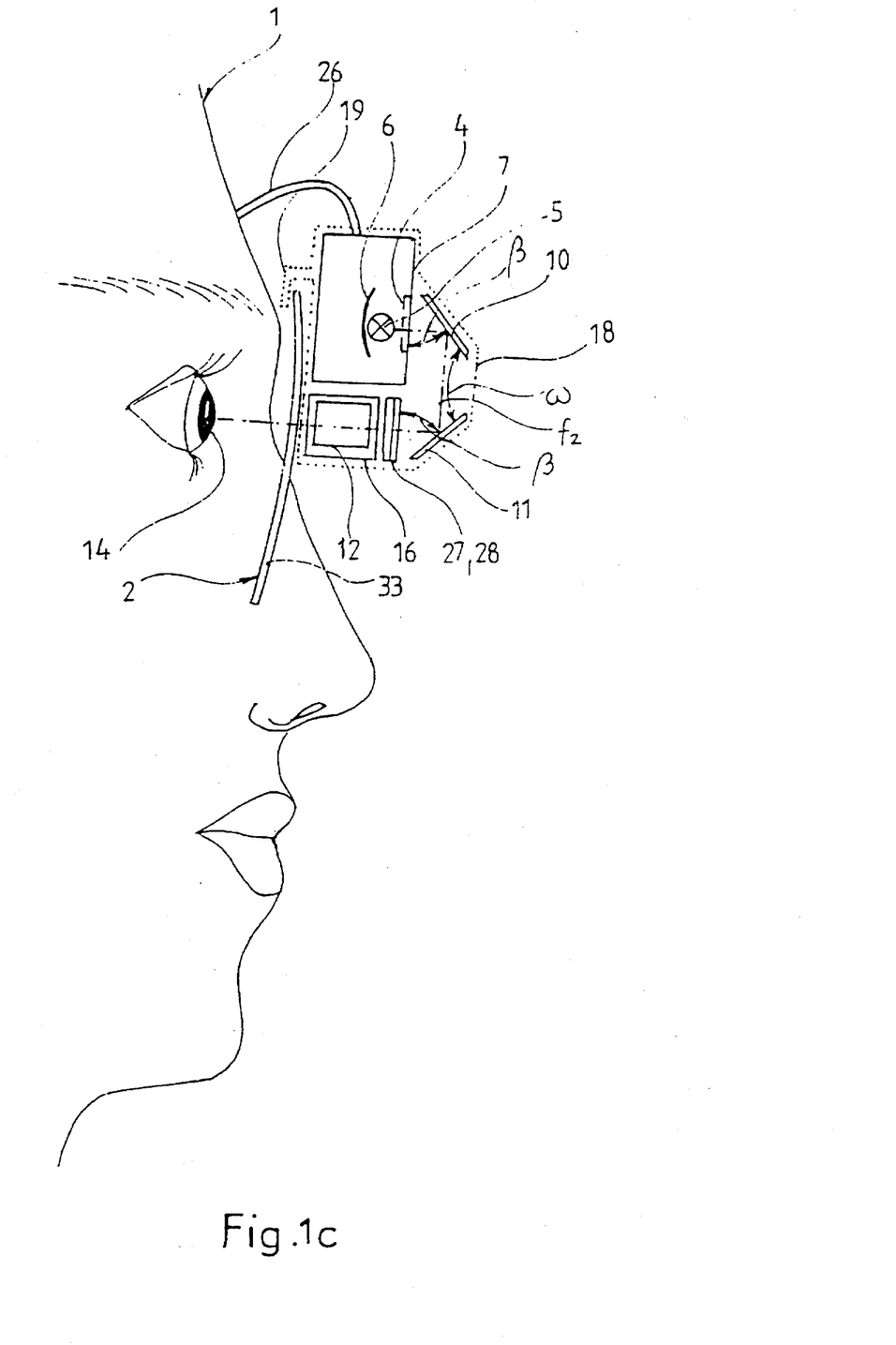
FIG. 1c is a side elevational view of the device of FIG. 1a, showing the head schematically.

The device shown in FIGS. 1a–1d is worn by the user on the head 1 as spectacles. The middle part of the frame 2 rests on the ridge of the nose, and the sidepieces 3 rest on the ears 24 (FIGS. 1a, 1c). The screen 4 of the device is arranged in front of the middle part of the frame 2, a little above said middle part, in a plane perpendicular to the median plane X of the head 1 (FIGS. 1a, 1b). As shown in FIG. 1c, the screen 4, the light-source 5 (transilluminating light) placed behind the screen 4, and the parabolic mirror 6 are all together, fixed in an inner cover 7.

The right and left side dividing mirrors 8 and 9 of the device are fixed under the inner cover 7, at the height of the eyes (the pupils of the eyes are designated by reference numerals 14 and 15), between the eyes, in front of the ridge of the nose. The dividing mirrors 8 and 9 contain an angle α (FIG. 1b) of preferably 90°±35°. Said mirrors 8 and 9 are trapeziform or have a shape like a lying rectangle. The position of the dividing mirrors 8 and 9 is symmetrical to the median plane X of the head 1 (FIG. 1b), and the short edges of the mirrors, which are more distant from the head 1, meet in the median plane X of the head 1 (note that because of the more or less irregular shape of the human head, the median plane X is a theoretical plane of symmetry).

Outside the screen 4 (seen from the head 1), i.e. in front of the screen 4, the device has an upper first common mirror 10 and, under it, a lower second mirror 11. The common mirrors 10 and 11 have the shape of a lying rectangle or, corresponding to the cross-section of the light beam, a trapezium (with two parallel sides). Said mirrors 10 and 11 are arranged perpendicular to the median plane X of the head 1. The first common mirror 10 forms an angle β of about 45° with the plane of the screen 4 (FIG. 1c). The lower second common mirror 11 is arranged under the first common mirror 10, at the height of the pupils 14,15, and its plane forms an angle ω of about 90° with the plane of the first common mirror 10.

The device according to FIGS. 1a–1d has two further mirrors: these are the separate mirrors 12,13. The left side separate mirror 12 is situated in front of the left pupil 14, and the right side separate mirror 13 in front of the right pupil 15; the distance between the pupils and the corresponding separate mirrors is preferably about 3–4 cm. The inclination and spacial position of the separate mirror 12 correspond to the dividing mirror 8, and the inclination and spacial position of the separate mirror 13 correspond to the dividing mirror 9; these pairs of mirrors can be parallel, too. The planes of the separate mirrors 12,13 contain an angle of about 90° (angle γ in FIG. 1b).

In this embodiment of the device, lenses 16,17 are also contained. The lens 16 is arranged beside the left side dividing mirror 8, outside; the lens 17 is arranged beside the right side dividing mirror 9, also outside. The lenses 16,17 are preferably parallel or substantially parallel. It results from the described arrangement that the lens 16 is between the dividing mirror 8 and the separate mirror 12; and the lens 17 is between the dividing mirror 9 and the separate mirror 13.

The inner cover 7, the first common mirror 10, the second common mirror 11, the dividing mirrors 8 and 9, and the lenses 16 and 17 are inside the cover 18. In the wall of the cover 18, between the lens 16 and the separate mirror 12, and between the lens 17 and the separate mirror 13, respectively, there is an opening or window for passing the light. Accordingly, the position and size of the opening or window correspond to the light path; the opening can be even larger than the cross-section of the beam. Fixing elements 19 (e.g. hooks, screws, clips etc.) are attached to the wall of the cover 18 adjacent to the frame 2. A console is fixed to, or formed integrally with, each side of the cover 18 facing the separate mirrors 12 and 13, respectively. The consoles project before, and laterally beyond, the respective separate mirrors. The left side console and right side console, indicated by reference numerals 20 and 21, respectively, are made of a preferably transparent material clear as water. The separate mirror 12 is fixed to the left side console 20 by means of a slide 22 (FIG. 1b) enabling the separate mirror 12 being moved along the axis of the light path parallel to itself, in order to set the separate mirror 12 in front of the left side pupil; this is required because of the individually different distance of pupils. Similarly, the separate mirror 13 is attached to the right side console 21 by means of the slide 23 to adjust the separate mirror 13 in the same manner as in the case of the separate mirror 12.

The liquid crystal screen 4, the light source (transilluminating light) 5 and the loudspeaker 25 put into the ear 24 are controlled and supplied through the cable 26 (FIG. 1a). The cable 26 is led out of a controlling-connecting unit (not shown) comprising the driving electronics of the liquid crystal screen 4, and electric cable connectors for the source of video and audio signals. To have a stereoscopic image, LCD light shutters 27 and 28 are to be placed in front of the left side dividing mirror 8 and the right side dividing mirror 9, respectively (FIG. 1c). The light shutters receive control pulses through the cable 26.

In the system described above, preferably vacuum metallized mirrors are used; it is to be noted, however, that e.g. prisms can be substituted for the mirrors. The fixing elements, e.g. screws, snaps, hooks, clips etc, ensure connections which can be loosened. However, this is not always necessary; the cover 18 can be fixed to the frame 2 by means of final (undetachable) connections, too. Nevertheless, clips are considered as particularly advantageous fasteners because the cover 18 together with the enclosed elements can be clipped to an existing spectacle-frame in the simplest and fastest way, i.e. people wearing spectacles can clip the device according to the invention to their own spectacles. People otherwise not wearing spectacles can combine the device according to the invention with spectacles having lenses of zero dioptre (plano-parallel lenses). The spectacles have three essential functions: first, a pair of spectacles is a simple instrument to wear the device according to the invention on the head; second, the glass lenses in the spectacle-frame protect the eyes from the sharp corners of the separate mirrors 12 and 13; and finally, the people wearing spectacles see the screen 4 through their own spectacles, which ensures an appropriate sharpness of the image for them.

However, it is not absolutely necessary to use spectacles for the device according to the invention. The consoles 20 and 21 can be led to the ears instead of the sidepieces of the spectacles, if they are made of a suitably hard and stiff material, and have a broken line shape. In this case, the spectacle-frame, the glass lenses in the frame and the sidepieces can be omitted, but a nose support and fixing means on the sides or the back of the head 1 should be provided, e.g. by means of hooks resting on the ears or bands of tear-fasteners connectible on the back of the head, to make the device cording to the invention wearable as spectacles.

Concerning the loudspeaker 25 (FIG. 1a), it should be noted that it can be built into the sidepiece(s) 3 (FIG. 1b), too. To have stereophonic effect, a loudspeaker 25 is built in each sidepiece 3.

As to lenses 16,17, they can be built into the left side or right side light path even at other places than illustrated in FIGS. 1a–1c, e.g. directly in front of the separate mirrors 12 and 13, i.e. between the pupils 14,15 and the separate mirrors 12,13. It is also possible to place several lenses into each light path. The LCD light shutters 27 and 28 can also be placed anywhere in the left side and right side light paths, respectively, and not only at the places described above and illustrated in the Figures.

Figure 1D:
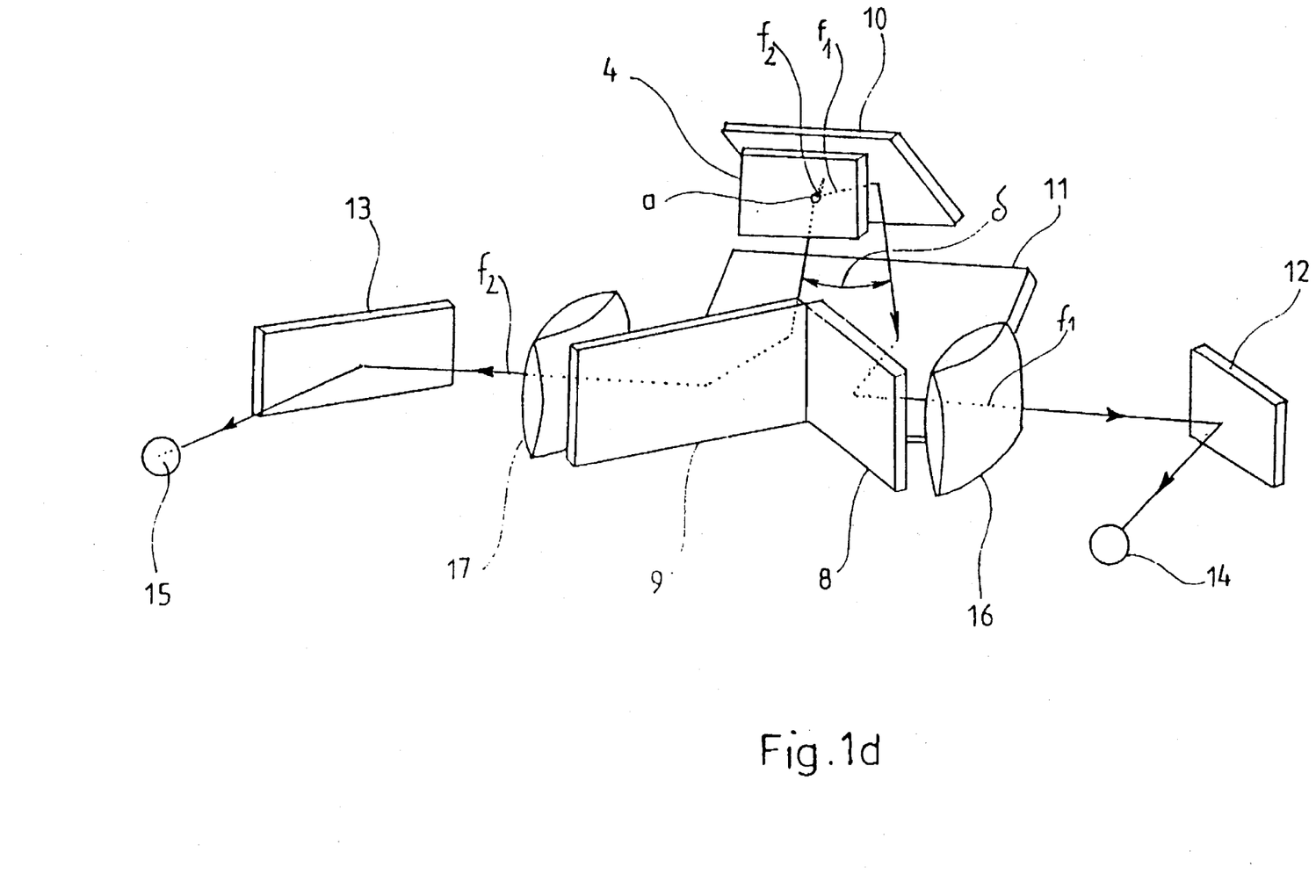
FIG. 1d is a perspective view showing the spacial arrangement of the optical elements of the device according to FIGS. 1a–1c on a larger scale.

The device according to FIGS. 1a–1d is used as follows (the light paths are particularly distinct in FIG. 1d):

The frame 2 (spectacle-frame) together with the device is put on the head 1, as shown in FIGS. 1a and 1c, and by switching on the controlling-connecting unit (not shown), the device is set into operation through the cable 26. A light beam (light path) starts from the screen 4 (or image) outwards, i.e. from the face away. For the sake of simplicity and intelligibility, the bundle-like beam or path is shown in FIG. 1d by a single line like an elementary ray of light starting from the geometric centre K of the screen 4 and spreading to the centres of the pupils 14,15 (the sections of the light paths covered by mirrors or lenses are dotted in FIG. 1d). The beam coming from the screen 4 is reflected by the upper first common mirror 10 and then by the lower second common mirror 11 (see FIG. 1c, too), and gradually split into two light path branches $f_1$ and $f_2$ which get to the left side dividing mirror 8 and the right side dividing mirror 9, respectively. The left side light path branch $f_1$ is focused when passing through the lens 16, and then reflected by the left side separate mirror 12; finally it arrives at the left pupil 14. Similarly, the right side light path branch $f_2$ is focused by the lens 17, reflected by the right side separate mirror 13, and received by the right pupil 15. Since both eyes of the person using the device see the image magnified by the lenses 16 and 17, respectively, at the same place in the space, the two images merge into a single image. As the separate mirrors 12 and 13 are in transparent surroundings, the image seems to float and the surroundings round the image can be viewed without difficulty. In FIG. 1b, the entire light beams (bundles) $n_1$, $n_2$ corresponding to the light path branches are shown, where the middle lines are designated by $f_1$ and $f_2$.

Figure 2A:
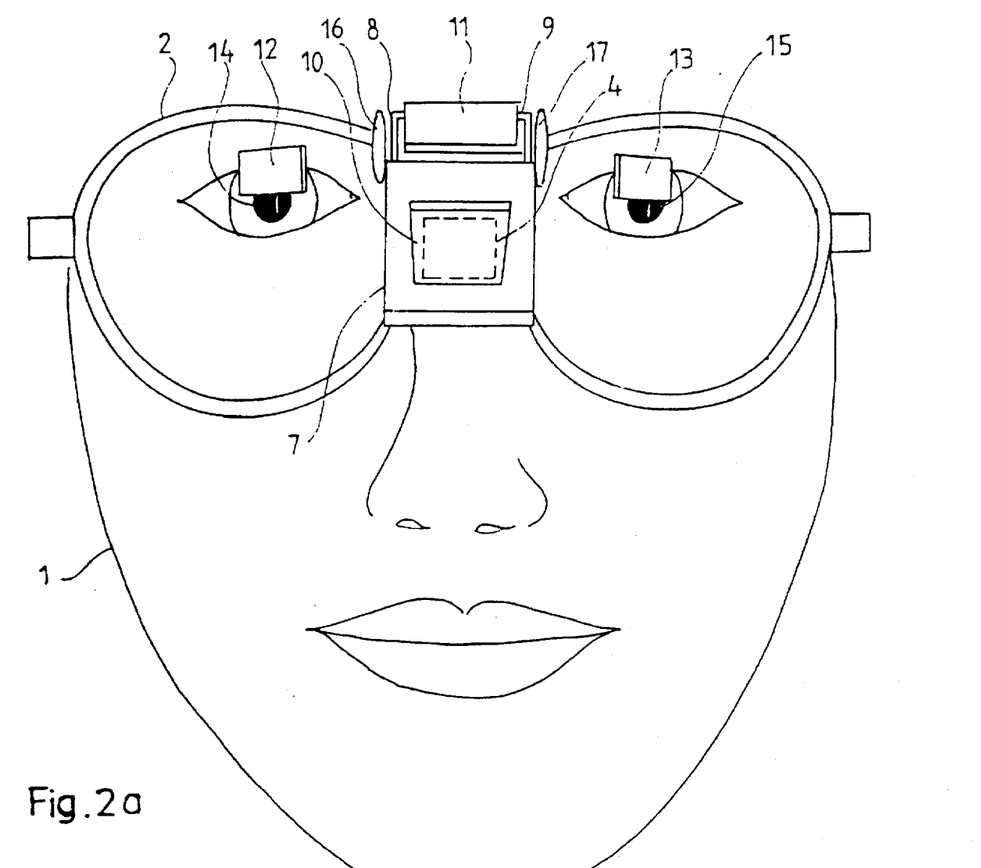
FIG. 2a is a front elevational view of another embodiment of the device according to the invention showing the head schematically.
Figure 2B:
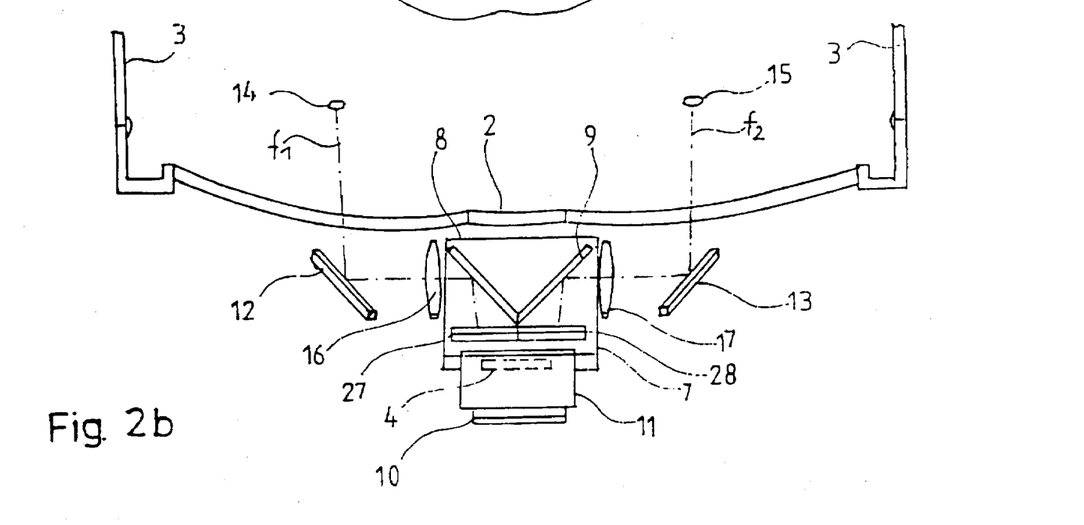
FIG. 2b is a top plan view of the device of FIG. 2a without the head.
Figure 2C:
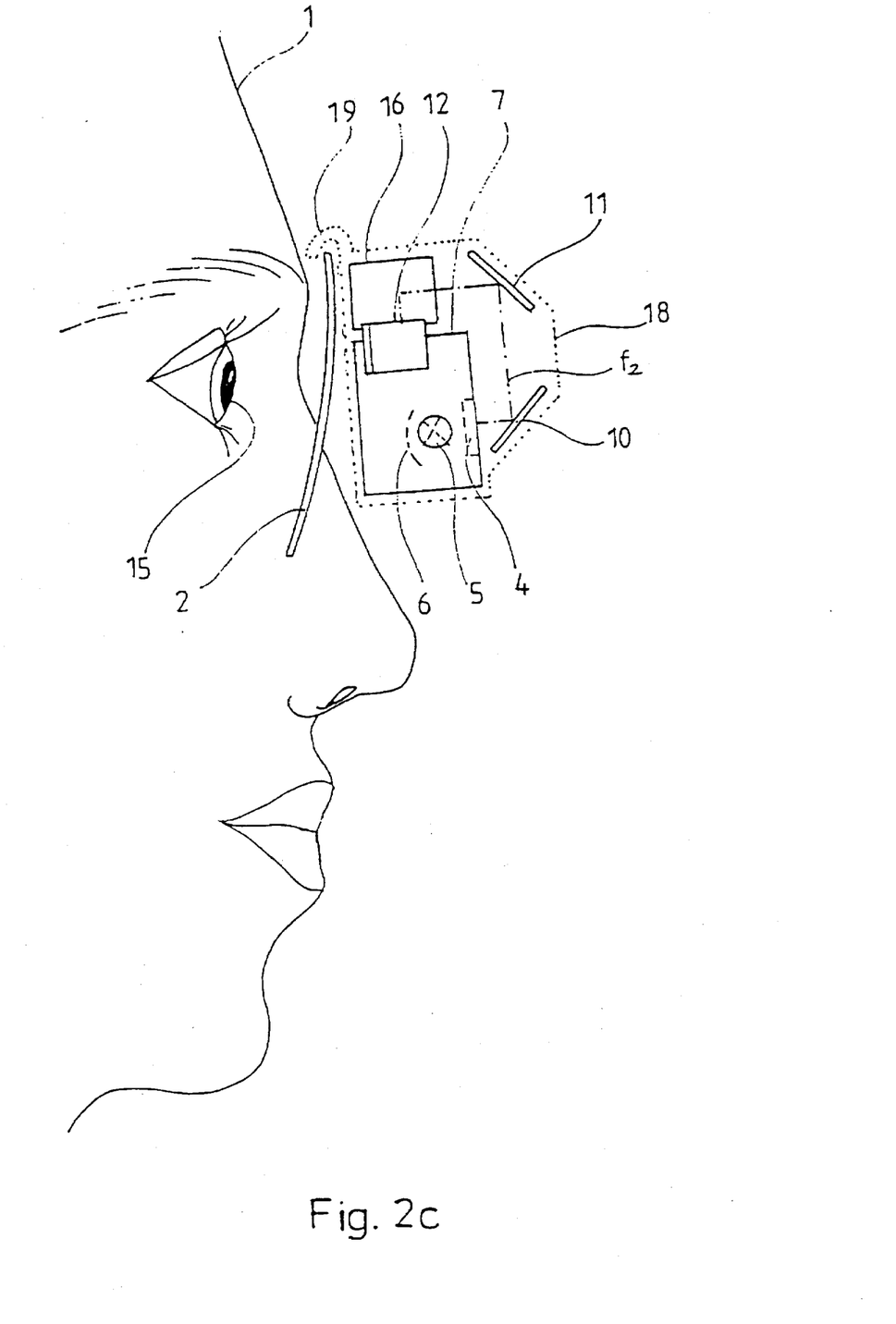
FIG. 2c is a side elevational view of the device of FIGS. 2a and 2b showing the head schematically.

The embodiment of the device according to FIGS. 2a–2c has essentially the same construction as the embodiment shown in FIGS. 1a–1d, therefore the elements described previously are designated with the same reference numerals. The difference lies in that the screen 4 (or image) is under the dividing mirrors 8,9 (and not above them). In this case, the distribution of weight of the device is better, but the cover 18 (FIG. 2c) in front of the ridge of the nose protrudes further into the field of sight. This device is used as described before; the light path starting from the screen 4 is divided into two light path branches in the same manner as in the embodiment of the device in accordance with FIGS. 1a–1d.

Figure 3A:
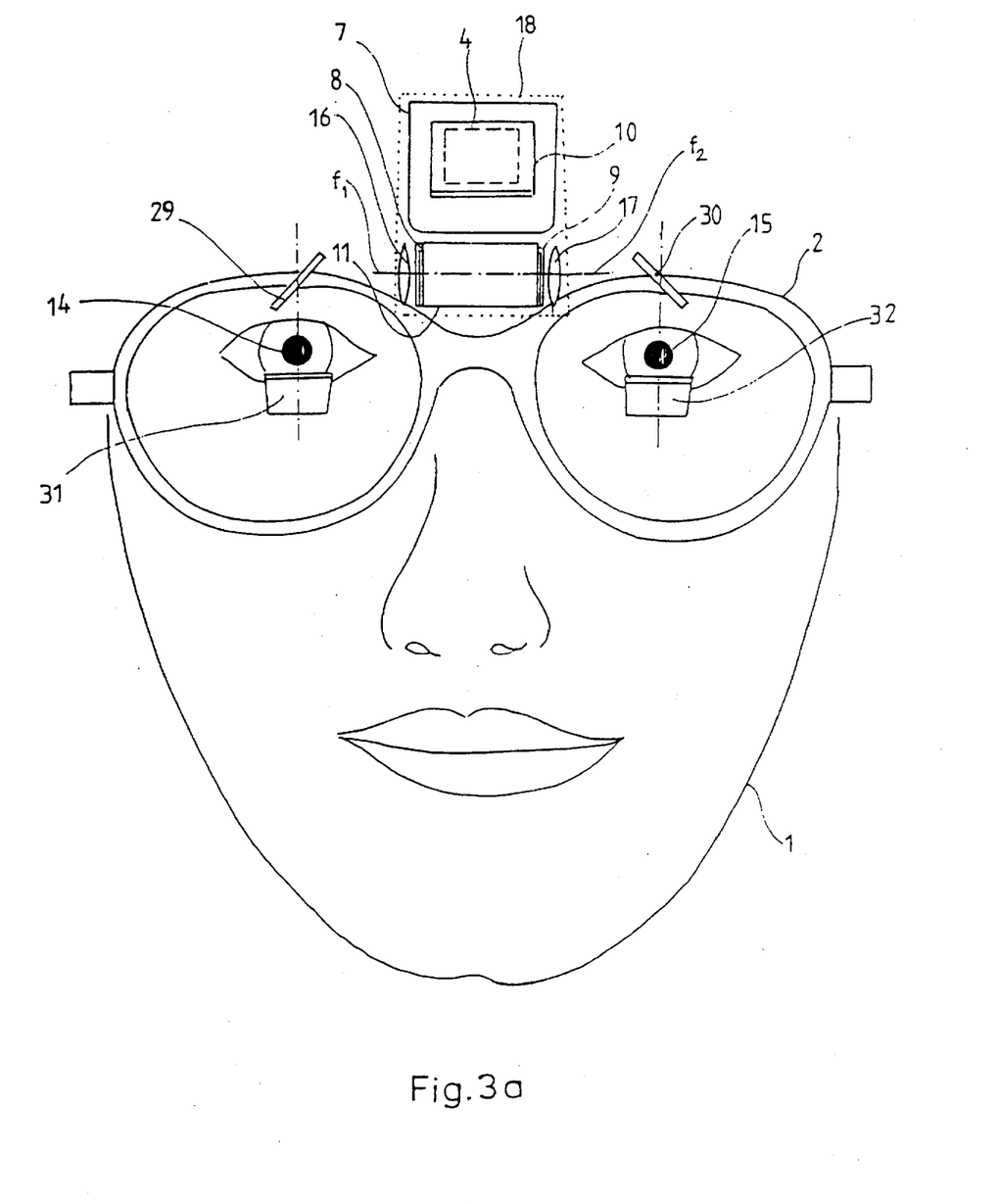
FIG. 3a is a front elevational view of a further embodiment of the device according to the invention showing the head schematically.
Figure 3B:
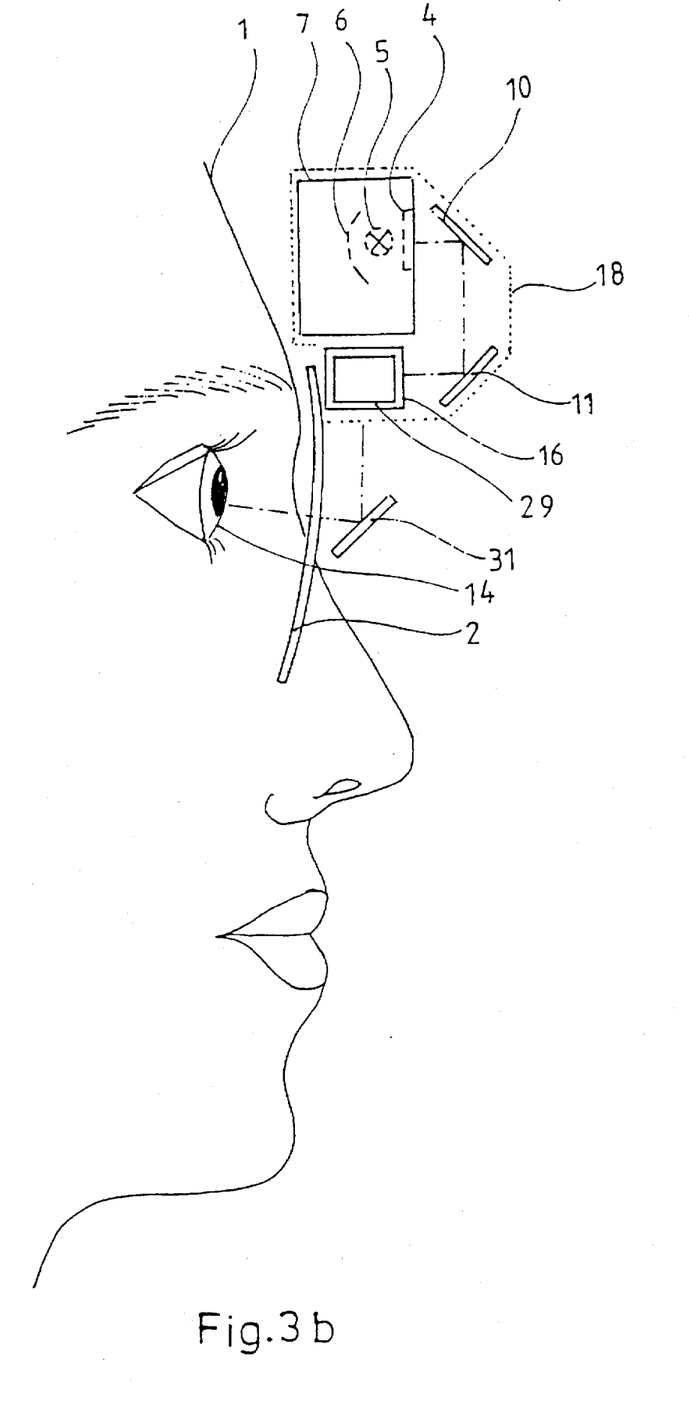
FIG. 3b is a side elevational view of the device of FIG. 3a showing the head schematically.

In the embodiment shown in FIGS. 3a and 3b, the same elements are designated by the same reference numerals as in the previous embodiments. This embodiment differs from the embodiment of FIGS. 1a–1d in that the cover 18 is shifted upwards farther out of the field of sight. The left side and right side first separate mirrors 29 and 30 of the device are above the eyes of the user, while the left side and right side second separate mirrors 31 and 32 are below the eyes. With use, the first separate mirrors 29 and 30 direct the light path branches $f_1$, $f_2$ focused by the lenses 16,17 downwards, and then the second separate mirrors 31 and 32 reflect the light path branches into the pupils 14,15 somewhat from below, but not front-wise. If the user of the device looks down a little, the image is seen at a convenient angle of reading.

As already mentioned, a prism can be used instead of any one of the mirrors. The separate mirrors 12,13 shown in FIGS. 2a–2c, and the second separate mirrors 31 and 32 shown in FIGS. 3a, 3b can be semipermeable mirrors.

If it is desired to eliminate the external light of surroundings from the field of sight, the device can be completed by a non-transparent or darkened transparent cover or lid which can be put e.g. on the frame 2 (spectacle-frame) disclosing the cover 18 and the consoles 20,21. In a preferred embodiment, said additional cover or lid can be turned up.

Returning to the FIGS. 1a–1d, it is to be noted that the glass lenses 33,34 in the frame 2 (spectacle-frame) can be made of dark-coloured glass (protecting the eyes from bright sunshine), but in this case the screen 4 (image) is also seen darkened, which is not favourable. Therefore, it is preferred to use glass lenses 33,34 where the parts between the left side pupil 14 and the separate mirror 12, and the right side pupil 15 and the separate mirror 13, respectively, are cut out or made of a material clear as water, and the other parts of the lenses are dark-coloured, i.e. [00cc]surrounding external space is practically constant, i.e. when going out of a dark room to the sunlight, the TV picture or any other image remains distinctly visible.

The advantageous effects connected with the invention can be summarized as follows:

The user of the device can view a screen or image fixed e.g. to the middle part of a spectacle-frame comfortable and clear with both eyes. The reason is that the screen or image is in a plane perpendicular to the median plane of the head, and the symmetric optical system in accordance with the invention transmits this image to both eyes. The user wearing a device, where the elements of the system are set exactly, sees the image, e.g. a TV picture, with both the left and the right eye on the same place in the space 2 to 3 metres distant away, in front of himself. The device according to the invention is light and small-sized, can be designed aesthetically, and therefore its sphere of applicability is very wide: one can wear and view it in public places, e.g. in streets and squares; when waiting for something or travelling on different vehicles; when working in the house or garden; when learning etc. Any video signal can be displayed on the screen, therefore the device can be connected to a portable tuner to receive TV transmissions, or to a video player, video camera or computer. Replacing the screen by a square of film, a static image, e.g. a table or a page of a dictionary to memorize, can be displayed by the device. It is also possible to replace the screen by a reduced print on a non-transparent paper which can be illuminated sufficiently by the external light of surroundings; in this case, the light-source (transilluminating light) and the parabolic mirror can be omitted.

It is to be understood that while only certain preferred embodiments of the present invention have been described and illustrated herein, numerous variations or alterations can be made without departing from the spirit and scope of the invention defined by the appended claims.

What is claimed is:

1. Head worn image display device, particularly for displaying TV pictures, having a screen (4) or image holder being arranged in front of the ridge of nose or the middle part of the forehead of the person wearing the device, in the theoretical imaginary median plane of the head (1), perpendicularly to said median plane, said device comprising light beam dividing optical elements (8,9) having reflecting surfaces symmetrical in relation to said median plane (x) of the user's head (1) and dividing said light beam into beam branches ($f_1$, $f_2$) and directing them towards the user's eyes;

optical elements (12,13) reflecting said beam branches ($f_1$, $f_2$) into the pupils (14,15) of the user's eyes; and focusing elements (16,17) characterized by a first light beam reflecting optical element (10) directing the light beam starting outwards from the screen (4) or image upwards or downwards in relation to the user's head; and a second light beam reflecting optical element (11) directing the light beam starting from said first reflecting optical element (10) to said light beam dividing optical elements (8,9).

2. Device as claimed in claim 1, characterized in that said focusing elements (16,17) being arranged between said light beam dividing optical elements (8,9) and said optical elements (12,13) reflecting beam branches ($f_1$, $f_2$) into the pupils (14,15).

3. Device as in claim 1 or 2, characterized in that the first light beam reflecting optical element (10) consists of a first common mirror; and the second light beam reflecting optical element (11) consists of a second common mirror.

4. Device as in claim 3, characterized in that the common mirrors (10, 11) have a shape preferably like a lying rectangle and/or trapezium, said common mirrors are in planes being perpendicular to the median plane (X) of the head (1), and forming an angle (w) of 90°±35° between each other and angles (β)—preferably equal in size—with the plane of the screen (4) or image.

5. Device as in any one of claims 1–4, characterized in that the reflecting optical elements, except the optical elements reflecting the beam branches into the pupils (14, 15), the focusing elements as well as the screen (4) or image, the light-source (5) and the parabolic mirror (6), possibly enclosed in an inner cover (7), are placed in a common outer cover (18) having an opening or openings and/or light transmitting surface or Surfaces; and said outer cover (18) is attached to a frame (2), preferably spectacle-frame, fixable on the head (1), e.g. to the ears (24).

6. Device as claimed in claim 5, characterized in that a fixing element (19), e.g. screw, hook, clip or the like, is provided for joining the outer cover (18) to the frame in a detachable manner.

7. Device as in claim 4 or 5, characterized in that consoles (20, 21) protruding on both sides toward the eyes, and preferably made of a transparent plastic plate, are fixed to—or possibly formed integrally with—the outer cover (18); and optical elements, preferably separate mirrors (12, 13), reflecting the part-beams into the pupils (14, 15) are connected to said consoles on the portion protruding into the surroundings of the eyes.

8. Device as claimed in claim 7, characterized in that the optical elements, preferably separate mirrors (12, 13), are connected to the consoles (20, 21) by means of slides (22, 23).

9. Device as in any one of claims 1 to 8, characterized in that LCD light shutters (27, 28) are placed in the track of the beam branches between the screen (4) or image and the pupils (14,15).

10. Device as claimed in claim 9, characterized in that the LCD light shutters (27, 28) are placed directly in front of the optical element(s) splitting the light beam into beam branches, preferably in front of the joined edges of the dividing mirrors (8,9), in a plane perpendicular to the median plane (X) of the head (1).

11. Device as in claim 9 or 10, characterized in that the LCD light shutters (27,28) belonging to the left side and right side beam branches have common glass plates with the liquid crystal between, but the LCD light shutters (27, 28) are connected in a manner enabling an individual voltage control.

12. Device as claimed in any one of claims 1 to 4, characterized in that the optical elements reflecting the beam branches into the pupils (14,15) consist of separate mirrors (12,13; 29,30)—preferably having the shape of a trapezium—, the planes of said separate mirrors form an angle (γ) preferably of about 90° between each other, and each of said separate mirrors is about 3 to 4 cm distant from the corresponding pupil (14,15).

13. Device as claimed in any one of claims 12 and 1 to 4, characterized in that the focusing elements are lenses (16, 17).

14. Device as claimed in any one of claim 12, 13, and 4 characterized in that the image or screen is placed above or below the optical element(s)—preferably dividing mirrors (8,9)—dividing the light beam into part-beams.

15. Device as claimed in any one of claims 12, 13, 1, to 4, characterized in that a light-source (5), preferably a transilluminating light, and a parabolic mirror (6) are placed behind the screen (4) or image in an inner cover (7).

16. Device as claimed in any one of claims 12 to 15 and 1 to 11, characterized in that a controlling-driving unit is provided, which is connected with the screen (4) or image, and possibly with the light-source (5), by means of an electric cable (26) passing the supply voltage and/or video signal and/or control informations.

17. Device as claimed in any one of 12 to 15, 16, and 1 to 11, characterized in that an earphone/loudspeaker is provided, which is connected to the electric system of the device.

18. Device as claimed in any one of claims 12, 15, 16 to 17 and 1–11, characterized in that two optical elements, preferably separate mirrors (31,29; 32,30), reflecting the beam branches into the pupils (14,15) are placed in each path of the beam branches.

19. Device as claimed in any one of claims 16 to 18 and 5 to 11, characterized in that the outer cover (18) is fixed to the frame, preferably spectacle-frame, in an indetachable manner, or it is formed integrally with said frame.

20. Device as claimed in any one of claims 16 to 19 and 7 to 11, characterized in that the consoles (20,21) have an elongated, broken-line part reaching behind the ears (24); and the outer cover (18) is provided with a nose support.

21. Device as claimed in any one of claims 16 to 20 and 5 to 11, characterized in that a darkened transparent or non-transparent additional cover is placed on the frame (2), preferably spectacle-frame, said additional cover having a spacial form disclosing the outer cover (18) and the consoles (20,21).

22. Device as claimed in claim 21, characterized in that the additional cover is joined to the frame (2), preferably spectacle-frame, or to the outer cover (18) by means of a hinge.

23. Device as claimed in any one of claims 16 to 22 and 5 to 11, characterized in that the lenses (33,34) in the spectacle-frame are made of darkened glass or plastics.

24. Device as claimed in any one of claims 16 to 22 and 5 to 11, characterized in that the lenses (33,34) have—regarding spectacles being worn—parts between the pupil (14,15) and the optical element reflecting a beam branch into the pupil, made of a material clear as water or cut out; and the other parts of the lenses are made preferably of a material darkening when exposed to light.

25. Device as claimed in any one of claims 12 to 15, 16 to 24 and 1 to 11, characterized in that the reflecting optical elements and the focusing elements are arranged symmetrically to the theoretical imaginary median plane of the head (1) of the user.

* * * * *

UNITED STATES PATENT AND TRADEMARK OFFICE
CERTIFICATE OF CORRECTION

PATENT NO. : 5,682,173
DATED : October 28, 1997
INVENTOR(S) : Holakovszky et al.

It is certified that error appears in the above-identified patent and that said Letters Patent is hereby corrected as shown below:

In column 7 at line 62, please delete " [00cc] " and insert -- function as sun-glasses. To the best advantage, special chlorophylled - sunglass-lenses are used which darken proportionally to the intensity of the external light; in this case, the contrast between the screen 4 or image and the --.

In column 10, claim 14, please delete " 4 " and insert -- 1 to 4 --.

In column 10, claim 15, please delete " 13 " and insert -- 13, 14 --.

In column 10, claim 16, please delete " 11 " and insert -- 4 --.

In column 10, claim 17, please delete " of 12 " and insert -- of claims 12 --.

Signed and Sealed this

Fourth Day of August, 1998

*Attest:*

*Attesting Officer*

BRUCE LEHMAN

*Commissioner of Patents and Trademarks*